United States Patent
Corghi (10) Patent No.: US 11,830,221 B2
(45) Date of Patent: Nov. 28, 2023

(54) METHOD FOR ALIGNING A VEHICLE SERVICE SYSTEM RELATIVE TO A VEHICLE

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 196 days.

(21) Appl. No.: 17/188,500

(22) Filed: Mar. 1, 2021

(65) Prior Publication Data

US 2021/0279910 A1 Sep. 9, 2021

(30) Foreign Application Priority Data

Mar. 6, 2020 (IT) .................. 102020000004822

(51) Int. Cl.
 *B60W 50/00* (2006.01)
 *G06T 7/80* (2017.01)
 *G06T 7/70* (2017.01)
 *B60W 50/04* (2006.01)

(52) U.S. Cl.
 CPC .............. *G06T 7/80* (2017.01); *B60W 50/04* (2013.01); *G06T 7/70* (2017.01); *B60W 2050/0083* (2013.01); *B60W 2420/42* (2013.01); *G06T 2207/30252* (2013.01)

(58) Field of Classification Search
 CPC ... G06T 7/80; G06T 7/70; G06T 2207/30252; B60W 50/04; B60W 2050/0083; B60W 2420/42
 USPC .......................................................... 701/1
 See application file for complete search history.

(56) References Cited

U.S. PATENT DOCUMENTS

| 5,675,515 | A | 10/1997 | January |
| 5,724,128 | A | 3/1998 | January |
| 5,870,315 | A | 2/1999 | January |
| 7,121,011 | B2 | 10/2006 | Murray et al. |
| 7,382,913 | B2 | 6/2008 | Dorranc et al. |
| 7,424,387 | B1 * | 9/2008 | Gill ...................... G01B 11/272 33/288 |
| 8,244,024 | B2 | 8/2012 | Dorrance et al. |
| 11,538,188 | B1 * | 12/2022 | Cejka ........................ G06T 7/80 |
| 2004/0049930 | A1 | 3/2004 | Murray |
| 2005/0078304 | A1 | 4/2005 | Dorrance et al. |
| 2005/0096807 | A1 * | 5/2005 | Murray .............. G01B 11/2755 33/288 |

(Continued)

*Primary Examiner* — Tyler J Lee
*Assistant Examiner* — Tiffany P Ohman
(74) *Attorney, Agent, or Firm* — PEARNE & GORDON LLP (57) ABSTRACT

A method is provided for aligning a vehicle service system relative to a vehicle positioned in a service area and provided with an Advanced Driver Assistance System, ADAS. The vehicle service system includes: a calibration structure, for calibrating an ADAS sensor of the ADAS of the vehicle, and an apparatus for measuring the alignment of the vehicle, wherein an optical device for capturing images is mounted on the apparatus. The method includes the following steps: applying a front wheel target and a rear wheel target on a front wheel and on a rear wheel of the vehicle; positioning the calibration structure and the apparatus at a position in front of the vehicle; capturing images through the optical device; and processing the images to derive information useful for positioning the calibration structure relative to the vehicle.

20 Claims, 6 Drawing Sheets

(56) References Cited

U.S. PATENT DOCUMENTS

2008/0186383 A1* 8/2008 Dorrance ................ G01S 5/16
  348/148
2015/0049199 A1* 2/2015 Rogers ................ H04N 23/698
  348/148

* cited by examiner

METHOD FOR ALIGNING A VEHICLE SERVICE SYSTEM RELATIVE TO A VEHICLE

BACKGROUND OF THE INVENTION

This invention relates to a method for aligning a vehicle service system relative to a vehicle and to a vehicle service system.

In the field of vehicle service systems, systems are known which comprise an apparatus for measuring the alignment of the vehicle, used to check the alignment of the vehicle wheels, and a calibration structure, used to calibrate an ADAS sensor of an advanced driver assistance system of a vehicle. Examples of these systems are described, for example, in the following patent documents: U.S. Pat. No. 8,244,024B2, U.S. Pat. No. 7,382,913B2, U.S. Pat. No. 7,121,011B2, U.S. Pat. No. 7,424,387B1.

In these systems, both the apparatus for measuring the alignment of the vehicle and the calibration structure must be positioned precisely relative to the vehicle. Positioning is performed with the aid of optical devices (cameras) and targets, which are associated with the apparatus for measuring the alignment of the vehicle, with the calibration structure and/or with the vehicle. For example, document U.S. Pat. No. 8,244,024B2 discloses an embodiment (illustrated in FIG. 3) where the alignment measuring apparatus mounts four cameras which view four targets on the wheels, and the calibration structure mounts another two cameras which also view two of the four targets on the wheels. Moreover, with reference to FIG. 5, U.S. Pat. No. 8,244,024B2 discloses that the four cameras mounted on alignment measuring apparatus may view also the targets mounted on the calibration structure (by having a very wide field of view of by having an adjustable field of view) or, alternatively, that the alignment measuring apparatus mounts six cameras, four of which view the four targets on the wheels and the other two of which view targets on the calibration structure. In this context, U.S. Pat. No. 8,244,024B2 discloses the following alternative options: (i) in a case wherein the four cameras mounted on the alignment measuring apparatus view also the targets mounted on the calibration structure, image data representative of the wheel targets (front and rear) and of the targets on the calibration structure are captured; (ii) in a case wherein the alignment measuring apparatus mounts six cameras, four of which view the four targets on the wheels and the other two of which view targets on the calibration structure, first image data representative of the wheel targets (front and rear) but not of the calibration structure target are captured, and second image data representative of the calibration structure target but not of the wheel targets (neither front nor rear) are captured. It is observed that U.S. Pat. No. 8,244,024B2 does not provide to capture image data which are representative both of the calibration structure target and of the front wheel target, but not of the rear wheel target. Hence, the system of U.S. Pat. No. 8,244,024B2 requires a large number of cameras (six), which means high cost, or alternatively four cameras which have a very wide or adjustable field of view, so that it includes the front wheel targets, the rear wheels targets and the calibration structure targets.

There is therefore a need for a system which allows precise alignment relative to the vehicle but which, at the same time, is simple and inexpensive.

BRIEF SUMMARY OF THE INVENTION

This disclosure has for an aim to provide a method for aligning a vehicle service system relative to a vehicle and a vehicle service system to overcome at least one of the above mentioned drawbacks of the prior art.

This aim is fully achieved by the method for aligning a vehicle service system relative to a vehicle and by the vehicle service system of this disclosure, as characterized in the appended claims.

According to an aspect of it, this disclosure relates to a method for aligning a vehicle service system relative to a vehicle. The vehicle is positioned in a service area; by "service area" is meant any area which can receive the vehicle—in a vehicle repair shop, for example; the service area may be provided with marks or guides to assist with vehicle positioning.

The service system comprises a calibration structure. The calibration structure includes a calibration assistance device, configured to calibrate an ADAS sensor of an advanced driver assistance system of the vehicle. In an embodiment, the ADAS sensor of the vehicle is a camera; for example, the ADAS sensor may be a camera responsible for detecting a change of lane or a camera responsible for detecting the proximity of an object (for example, a pedestrian or another vehicle). In this case, the calibration assistance device is a panel bearing a predetermined combination of graphical features. In an embodiment, the ADAS sensor is a radar sensor. In this case, the calibration assistance device is a reflector panel or a mirror or a prism. In an embodiment, the ADAS sensor is an ultrasonic sensor. In an embodiment, the ADAS sensor is a LIDAR sensor.

The calibration structure includes a structure target. By "structure target" is meant any target that is associated or associable with the structure. For example, the structure target may be a target having a respective combination of graphical features; the target might coincide with the calibration device itself (for example, in the case where the calibration device is a panel for calibrating an ADAS camera or a reflector for calibrating an ADAS radar sensor). Preferably, the calibration structure is movable on wheels.

The calibration structure includes an apparatus for measuring the alignment of the vehicle (hereinafter: apparatus); an optical device for capturing images is mounted on the apparatus. The apparatus is distinct and separate from the calibration structure.

The method comprises a step of applying a front wheel target and a rear wheel target on a front wheel and on a rear wheel of the vehicle, respectively. The front and rear wheel targets bear (respective) combinations of graphical features. The combinations of graphical features appearing on the front wheel target and on the rear wheel target may be the same or different. The front wheel target and the rear wheel target may be the same or different in size. The front wheel target and the rear wheel target are fixed to the front wheel and to the rear wheel, respectively. More specifically, the front wheel target and the rear wheel target may be fixed to the rims and/or to the tyres of the front wheel and of the rear wheel. The front wheel and the rear wheel are located on a first side of the vehicle.

The method comprises a step of positioning the calibration structure and the apparatus at a position in front of the vehicle. Preferably, the calibration structure and the apparatus are positioned in such a way that the calibration structure is interposed between the apparatus and the vehicle. The calibration structure and the apparatus are not necessarily positioned simultaneously. It should be noted that this step of positioning is a step of preliminary positioning (at least for the calibration structure).

The method comprises a step of capturing first image data and second image data through the optical device.

The method comprises a step of processing the first image data and the second image data in order to derive information useful for positioning the calibration structure relative to the vehicle; this step of processing is performed by a control unit. This information may be communicated to an operator, who moves the calibration structure to position it relative to the vehicle at a position complying with the manufacturer's specifications for calibrating the ADAS sensor; thus, the step of preliminary positioning is followed by a step of precise positioning based on the image data captured by the optical device. This step of positioning may be performed by the operator, assisted by the control unit, or it may be automated; in effect, the calibration structure may be self-propelled, driven by the control unit.

More specifically, the first image data may represent the rear wheel target but not the structure target. More specifically, the first image data may represent the rear wheel target but not the structure target. Hence, in an embodiment, it is provided to capture, in combination, first image data representative of the rear wheel target but not if the structure target and second image data representative of the structure target and, furthermore, of the front wheel target, but not of the rear wheel target. This combination is particularly advantageous, because it allows to have a limited number of cameras, with a limited field of view. Preferably, the first image data may also represent the front wheel target.

It should be noted that the expression "image data" is used to mean an image captured by the optical device or an image obtained by reprocessing one or more images captured by the optical device. More specifically, in an embodiment, the device captures a first image which includes (represents) the rear wheel target (and, preferably, the front wheel target) but not the structure target, and a second image which includes the structure target and the front wheel target but not the rear wheel target; thus, the first image data represent the first image and the second image data represent the second image.

In another embodiment, the first image data are obtained by the control unit processing (that is, combining) an image including the rear wheel target and an image including the front wheel target; and the second image data are obtained by the control unit processing (that is, combining) an image including the structure target and an image including the front wheel target.

More specifically, to capture the first image data, the optical device frames the rear wheel target and the front wheel target: that is to say, it has a first field of view that defines a spatial volume (in the shape of a cone) containing the rear wheel target and the front wheel target (but not the structure target). More specifically, in the context of this disclosure, an object is said to be contained in the field of view of a camera (or optical device) if it is inside the spatial volume defined by the field of view of the camera (or optical device), regardless of whether it is actually visible to the camera (or to the optical device) or hidden by another object. Thus, the optical device, having the first field of view, can capture a single (first) image including the rear wheel target and the front wheel target or, remaining at the position of the first field of view, it may capture at different time instants two images which the control unit will process to derive the first image data.

More specifically, the second image data are obtained by reprocessing two or more images captured by the optical device at different time instants in the case where, although the structure target and the front wheel target are both contained in the second field of view of the optical device, nevertheless the front wheel target is covered by (that is, is inside a shadow cone made by) the structure target or by the structure. In this case, an image including the front wheel target is captured at a first time instant when the structure target is not mounted on the structure, or the structure is not located at the position in front of the vehicle, and another image, including the structure target (but not the front wheel target because it is covered by the structure target itself, or by the structure) at a second time instant when the structure target is mounted on the structure and the structure is at the position in front of the vehicle; the control unit then processes the image and the other image to derive the second image data. It should be noted that the case in which the front wheel target is covered by the structure target itself or by the structure may occur, for example, when the vehicle is a van or a coach or an articulated lorry, so the calibration assistance structure must be positioned in such a way that the calibration device is high off the ground and thus in such a way that it can cover the front wheel target.

Similarly, to capture the second image data, the optical device frames the rear wheel target and the front wheel target: that is to say, it has a second field of view that defines a spatial volume containing the rear wheel target and the front wheel target (but not the structure target); thus, the optical device, positioned according to the second field of view, can capture a single (second) image including the rear wheel target and the front wheel target or, remaining at the position of the second field of view, it may capture at different time instants two images which the control unit will process to derive the second image data.

What is described in connection with the first image data also applies to the third and fourth image data, described in more detail below.

Thus, it should be noted that to position the calibration assistance structure and to measure the alignment of the wheels on the first side of the vehicle, the method of this disclosure requires only the first and the second image data and no further image data; the method of this disclosure is therefore simpler and faster than prior art methods.

According to an aspect of this disclosure, the first image data (or the first image) are captured before the second image data (or the second image). In this embodiment, the method preferably comprises, between the step of capturing the first image data and the step of capturing the second image data, a step of moving the optical device from a first position to a second position, different from the first position. The first image data are captured when the optical device is at the first position and the second image data are captured when the optical device is at the second position. Also, preferably, the optical device includes a camera; the first and the second image data are captured by the (same) camera. In this embodiment, therefore, a single camera, mounted on the apparatus, is enough to measure the alignment on one side of the vehicle and to position the calibration assistance structure; this helps to improve constructional simplicity and to contain the costs of the system.

In an embodiment, the optical device includes an additional camera. The method comprises a step of applying an additional front wheel target and an additional rear wheel target on an additional front wheel and on an additional rear wheel of the vehicle, respectively; the additional front wheel and the additional rear wheel are located on a second side of the vehicle, opposite to the first side. The method comprises a step of capturing third image data, representing the additional rear wheel target; the third image data are captured by the additional camera; the third image data are captured (concurrently with the first image data) when the optical device is at the first position. The method comprises a step of capturing fourth image data, representing the additional front wheel target; the fourth image data are captured by the additional camera; the fourth image data are captured (concurrently with the second image data) when the optical device is at the second position.

The camera and the additional camera are connected to a frame of the apparatus, spaced from one another. More specifically, the apparatus includes a frame having a horizontal rod; the camera and the additional camera are mounted at opposite ends of the rod.

The step of moving the optical device from the first position to the second position corresponds to a step of moving the frame away from the vehicle. More specifically, the frame moves from the first to the second position along (or in parallel with) an axis of symmetry and/or along (or in parallel with) a thrust axis of the vehicle. At the first position, the frame is closer to the vehicle than it is at the second position.

The calibration structure includes an additional structure target. Preferably, the fourth image data also represent the additional structure target but not the additional rear wheel target. The third image data also represent the additional front wheel target but not the additional structure target.

According to an aspect of this disclosure, the optical device comprises a first camera and a second camera having different fields of view (the first camera has a first field of view and the second camera has a second field of view); the first image data are captured by the first camera and the second image data are captured by the second camera. Preferably, the first and the second camera are mounted on the same structure (for example, a column) of the apparatus.

The optical device may also comprise a third camera and a fourth camera having different fields of view (the third camera has a third field of view and the fourth camera has a fourth field of view). The third and fourth cameras are spaced from the first and second cameras; more specifically, the third and fourth cameras are mounted on an additional structure (for example, an additional column) of the apparatus, which is spaced from the structure.

The method may comprise a step of applying an additional front wheel target and an additional rear wheel target on an additional front wheel and on an additional rear wheel of the vehicle, respectively; the additional front wheel and the additional rear wheel are located on a second side of the vehicle, opposite to the first side. The method may comprise a step of capturing third image data, representing the additional rear wheel target (and, preferably, the additional front wheel target but not the additional structure target); in this case, the third image data are captured by the third camera. The method may comprise a step of capturing fourth image data, representing the additional front wheel target (and, preferably, the additional structure target) but not the additional rear wheel target); in this case, the fourth image data are captured by the fourth camera.

This disclosure also provides a vehicle service system. The system comprises a calibration structure. The calibration structure includes a calibration assistance device, configured to calibrate an ADAS sensor of an advanced driver assistance system of a vehicle. The calibration structure includes a structure target.

The system comprises an optical device for capturing images; more specifically, the optical device is configured to capture first image data and second image data. The optical device includes at least one camera.

The system includes an apparatus for measuring the alignment of the vehicle. The optical device is mounted on the apparatus (that is, it forms part of the apparatus).

The system comprises a front wheel target and a rear wheel target. Preferably, the front wheel target and the rear wheel target bear respective combinations of graphical features. The front wheel target and the rear wheel target are configured to be applied on a front wheel and on a rear wheel of the vehicle, respectively. In an embodiment, the rear (or front) wheel target can be moved from the rear (or front) wheel to the structure and can thus perform both the function of rear (or front) wheel target and the function of structure target.

The system comprises a control unit, configured to process the first image data and the second image data captured by the optical device. Preferably, the first image data and the second image data are captured by the optical device in an operating configuration in which the calibration structure and the apparatus are in front of the vehicle. The control unit is configured to derive information useful for positioning the calibration structure relative to the vehicle as a function of the first image data and of the second image data. For example, this information may include an orientation relative to a thrust axis and/or an axis of symmetry of the vehicle, and/or a distance from a reference element on the vehicle (the logo, for example).

The optical device is configured to operate according to a first orientation (in which it has a first field of view), to capture the first image data, and according to a second orientation (in which it has a second field of view), to capture the second image data. It should be noted that the first orientation may be different from the second orientation, or the same as (that is, parallel to) the second orientation; the first field of view, on the other hand, is different from the second field of view. In effect, in an embodiment, the optical device may include a single camera which is translated from a first to a second position, so the field of view changes but the orientation may remain the same.

Thus, the first image data represent the rear wheel target (applied on the rear wheel) but not the structure target, and the second image data represent the structure target and the front wheel target (applied on the front wheel) but not the rear wheel target (applied on the rear wheel). Further, the first image data preferably also represent the front wheel target (applied on the front wheel).

In an embodiment, the optical device is operatively positionable at a first position and at a second position, different from the first position. The optical device includes a frame and a camera, associated with the frame. The camera has the first orientation when the optical device is at the first position, and the second orientation when the optical device is at the second position; the camera, when the optical device is at the first position, is configured to capture the first image data, and when the optical device is at the second position, the second image data.

The optical device includes an additional camera, associated with the frame. The system includes an additional front wheel target and an additional rear wheel target, configured to be applied on an additional front wheel and on an additional rear wheel of the vehicle, respectively. The additional front wheel and the additional rear wheel are located on a second side of the vehicle, opposite to the first side.

When the optical device is at the first position, the additional camera is configured to capture third image data, representing the additional rear wheel target, and when the optical device is at the second position, it is configured to capture fourth image data, representing the additional front wheel target.

In an embodiment, the optical device comprises a first camera and a second camera, having the first and the second orientation (that is, having different fields of view), respectively; thus, the first camera is configured to capture the first image data and the second camera is configured to capture the second image data.

The optical device may also comprise a third and a fourth camera, having a third and a fourth orientation (that is, having different fields of view) and configured to capture third image data and fourth image data.

In an embodiment of the method and/or of the system, the calibration assistance device includes a panel that bears a plurality of combinations of predetermined graphical features. In an embodiment, the plurality of combinations of predetermined graphical features is projected onto the panel (for example, by a projector). In an embodiment, the target panel is a television screen.

The combinations of graphical features may be used to calibrate a plurality of ADAS sensors (of a plurality of vehicles) or a single ADAS sensor; in effect, for some ADAS sensors (cameras) to be calibrated, the sensor needs to view different combinations of graphical features at a succession of time instants. The calibration assistance device may also include one or more covering devices, removably associable with the panel and configured to cover one or more combinations of graphical features of the plurality.

In an embodiment, the calibration assistance device includes a panel (bearing combinations of graphical features) and one or more targets removably associable with the panel, where each target bears one combination of graphical features.

In an embodiment, the one or more targets are magnetically associable with the panel. In another embodiment, the one or more targets are associable with the panel by means of guides provided on the panel. In a further embodiment, the target may be hung at the top end of the panel and/or on supporting pins provided on the panel.

BRIEF DESCRIPTION OF THE SEVERAL VIEWS OF THE DRAWINGS

These and other features will become more apparent from the following detailed description of a preferred, non-limiting embodiment, illustrated by way of example in the accompanying drawings, in which.

DETAILED DESCRIPTION OF THE INVENTION

With reference to the accompanying drawings, the numeral 1 denotes a vehicle service system. Further, the numeral 2 denotes a vehicle.

The system 1 comprises a calibration structure 3. The calibration structure 3 includes a calibration assistance device 31, configured to calibrate an ADAS sensor of an advanced driver assistance system of the vehicle 2. The calibration structure 3 includes a structure target 32. During calibration, the vehicle 2 is positioned in a service area 8 and the calibration structure 3 is located at a position in front of (or behind) the vehicle 2.

The system 1 includes an apparatus 4 for measuring the alignment of the vehicle 2. The vehicle 2 may be a motor car, or a van, or a coach, or a lorry, or other vehicle. The apparatus 4 comprises an optical device 40. The optical device comprises a camera 41.

Figure 5:
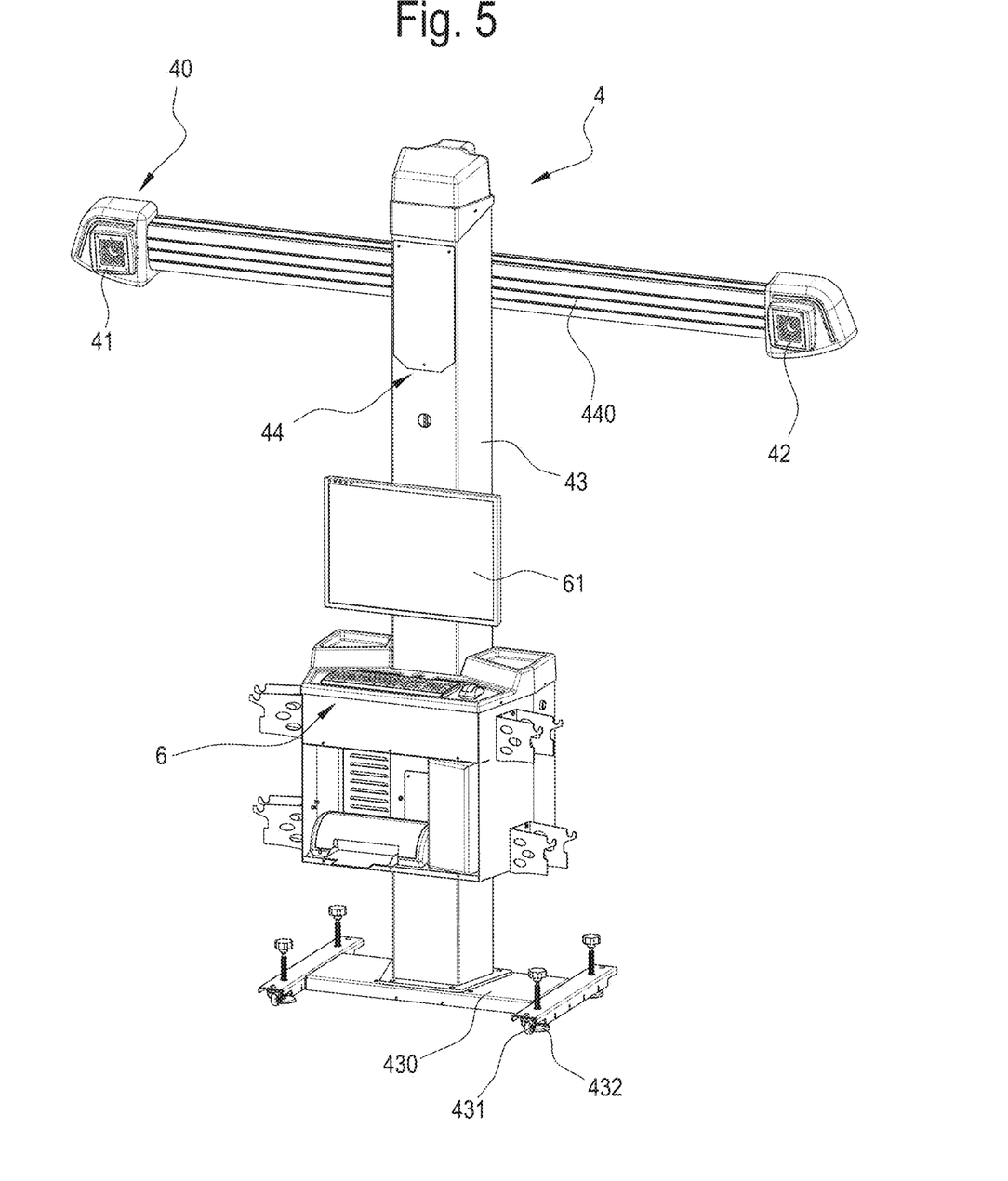
FIG. 5 shows an embodiment of the apparatus of the system of FIG. 1 (or of FIG. 2)

It should be noted that, in an embodiment, the optical device 40 comprises an additional camera 42. In an embodiment, the apparatus 4 comprises a frame 44. The additional camera 42 and the camera 41 are both associated with the frame 44. More specifically, the frame 44 comprises a supporting bar 43, oriented vertically (in a direction parallel to gravity). The frame 44 also comprises a horizontal bar 440, mounted on the supporting bar 43 and oriented perpendicularly to the supporting bar 43. The horizontal bar 440 extends between two opposite ends; the camera 41 and the additional camera 42 are disposed at the opposite ends of the horizontal bar 440. The apparatus 4 preferably also includes a base unit 430 on which the frame 44 is mounted. More specifically, the supporting bar 43 is mounted on the base unit 430. The base unit 430 includes a plurality of wheels 431. The base unit 430 may also include a plurality of stabilizer feet 432, movable between a rest position and an operating position; when the stabilizer feet 432 are at the rest position, the base unit 430 is movable on the wheels 431; when the stabilizer feet 432 are at the operating position, on the other hand, they prevent the base unit 430 from moving on the wheels 431.

Figure 6:
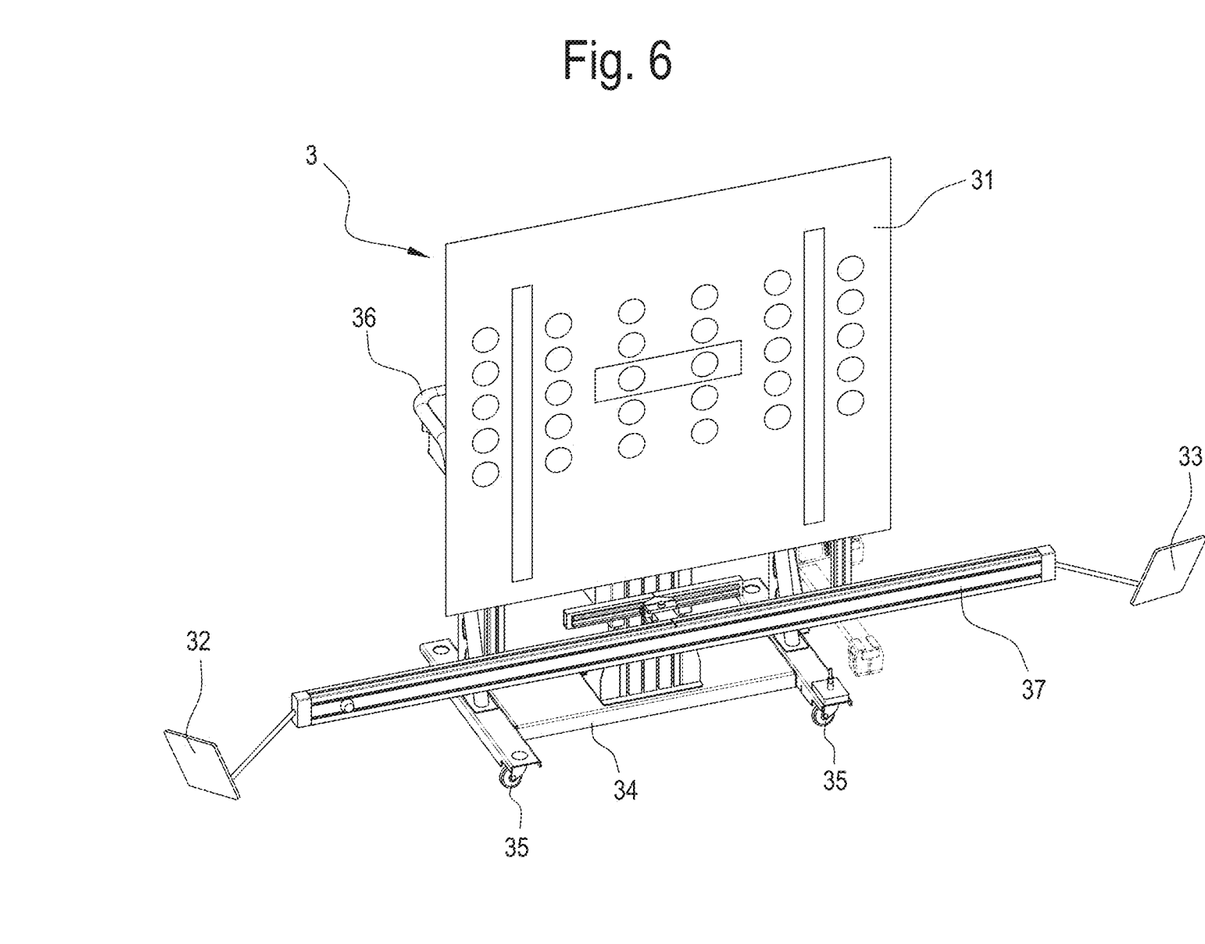
FIG. 6 shows a calibration structure of the system of FIG. 1 (or of FIG. 2)
Figure 7:
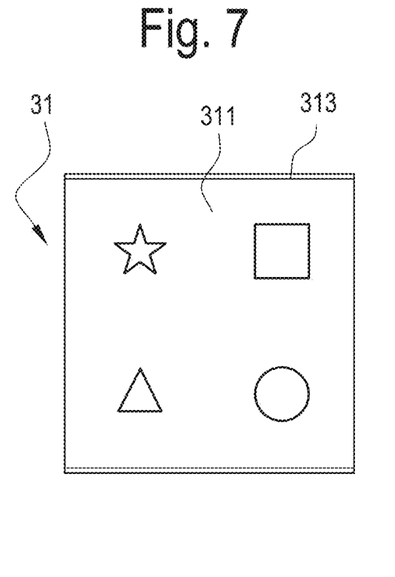
FIGS. 7 and 8 show respective variant embodiments of a calibration assistance device of the calibration structure, where the panel of the device represents a plurality of combinations of graphical features.
Figure 7A:
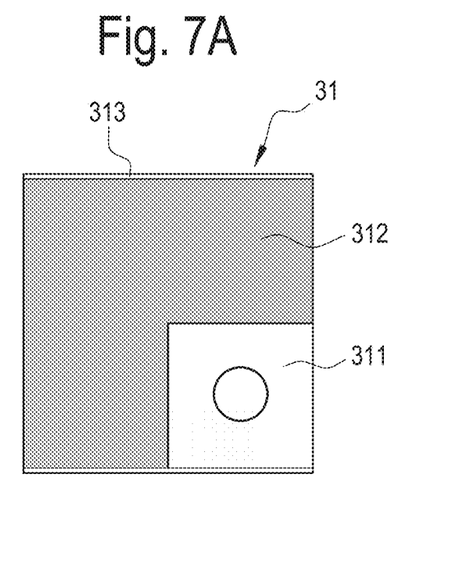
FIGS. 7A and 8A show the calibration assistance device of FIGS. 7 and 8, respectively, in an operating configuration where some combinations of graphical features are covered.
Figure 8:
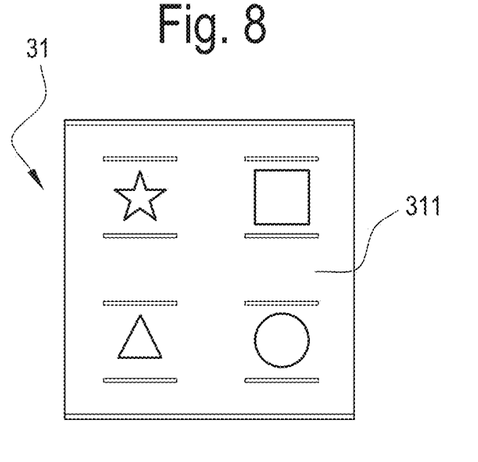
Figure 8A:
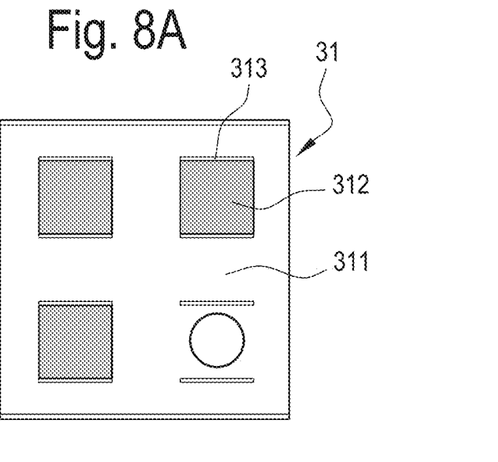

In an embodiment, the calibration structure 3 includes an additional structure target 33. The calibration structure includes a frame. The frame includes a horizontal bar 37; preferably, the structure target 32 and the additional structure target 33 are mounted at opposite ends of the horizontal bar 37. It should be noted that the position of the structure target and the position of the additional structure target 33 are preferably predetermined relative to the horizontal bar 37, hence relative to the calibration assistance device 31. Preferably, the frame includes a handle 36 which is grippable by an operator to move the structure 3. The structure 3 includes a base unit 34 on which the frame is mounted. The base unit 34 includes a plurality of wheels 35. The base unit 34 may also include a plurality of stabilizer feet (not illustrated), movable between a rest position and an operating position; when the stabilizer feet are at the rest position, the base unit 34 is movable on the wheels 35; when the stabilizer feet are at the operating position, on the other hand, they prevent the base unit 34 from moving on the wheels 35.

The calibration assistance structure 31 includes a panel 311. The calibration assistance structure 31, or the panel 311, is connected to the frame of the structure 3; preferably, the calibration assistance structure 31, or the panel 311, is connected removably to the frame of the structure 3. In an embodiment, the panel 311 bears a combination of graphical features to calibrate the ADAS sensor. In an embodiment, the panel 311 bears a plurality of combinations of graphical features to calibrate a plurality of ADAS sensors; in this case, the calibration assistance device 31 may also include one or more covering devices 312, removably connectable to the panel 311 and configured to cover one or more combinations of graphical features of the plurality. More specifically, the panel 311 may be provided with one or more guides 313 to receive the one or more covering devices 312. In an embodiment, there is a guide 313 disposed along one side of the panel 311 (or a pair of guides 313 disposed on opposite sides of the panel 311) to receive a covering device 312 that covers all the combinations of graphical features except one, which thus remains visible to the ADAS sensor. In another embodiment, there is a covering device 312 and a guide 313 (or a pair of guides 313) for each combination of graphical features appearing on the panel 311; in this case, there is a guide 313 (or a pair of guides 313) for each combination of graphical features appearing on the panel 311. In another embodiment, there is a covering device 312 which may be hung at the top end of the panel 311. In yet another embodiment, a covering device 312 may be hung on supporting pins which the panel 311 may be provided with.

The system 1 comprises a control unit 6, including a user interface 61 to communicate with an operator. In an embodiment, the control unit 6 (and the user interface 61) is located on the structure 3.

The system 1 comprises a front wheel target 51 and a rear wheel target 52 applicable on a front wheel and on a rear wheel located on a first side of the vehicle 2.

In an embodiment, the system comprises an additional front wheel target 53 and an additional rear wheel target 54 applicable on an additional front wheel and on an additional rear wheel of the vehicle 2, located on a second side of the vehicle 2. It should be noted that the wheel targets 51, 52, 53, 54 bear combinations of graphical features; the combinations of graphical features appearing on the wheel targets 51, 52, 53, 54 may be identical.

The optical device 40 is configured to view the front wheel target 51 and the rear wheel target 52 in order to make alignment measurements. The optical device 40 is also configured to view the additional front wheel target 53 and the additional rear wheel target 54.

This disclosure also provides a method for aligning (that is, positioning) the vehicle service system 1 relative to the vehicle 2 positioned in the service area.

The method comprises a step of applying the front wheel target 51 on the front wheel on the first side of the vehicle 2. The method comprises a step of applying the rear wheel target 52 on the rear wheel on the first side of the vehicle. The method comprises a step of applying the additional front wheel target 53 on the front wheel on the second side of the vehicle 2. The method comprises a step of applying the additional rear wheel target 54 on the rear wheel on the second side of the vehicle 2.

The method comprises a step of positioning the apparatus 4 at a position in front of the vehicle.

Figure 3:
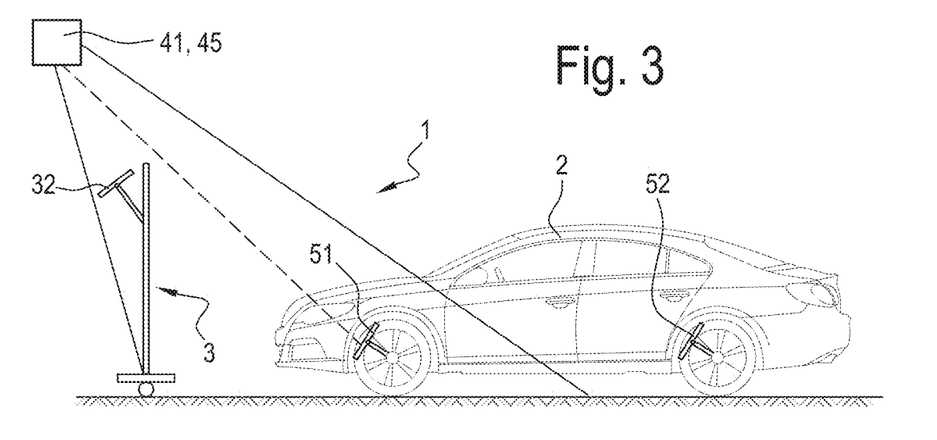
FIG. 3 shows a side view of the vehicle service system of FIG. 1 (or of FIG. 2) in a configuration in which the camera captures an image of the structure target and of the front wheel target, to form the second image data.
Figure 4A:
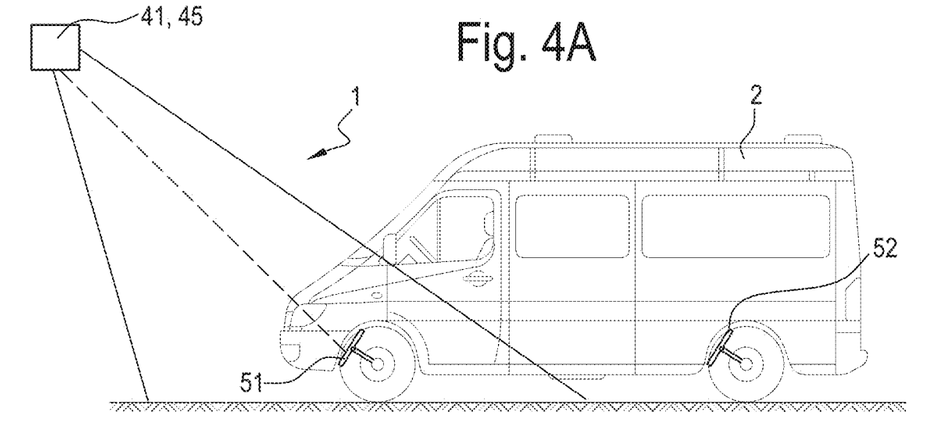
FIGS. 4A and 4B show side views of the system of FIG. 1 (or of FIG. 2), respectively in a first step in which the camera captures an image of the front wheel target and in a second step in which the camera, remaining at the same position relative to the vehicle, captures an image of the structure target, where these images form the second image data.
Figure 4B:
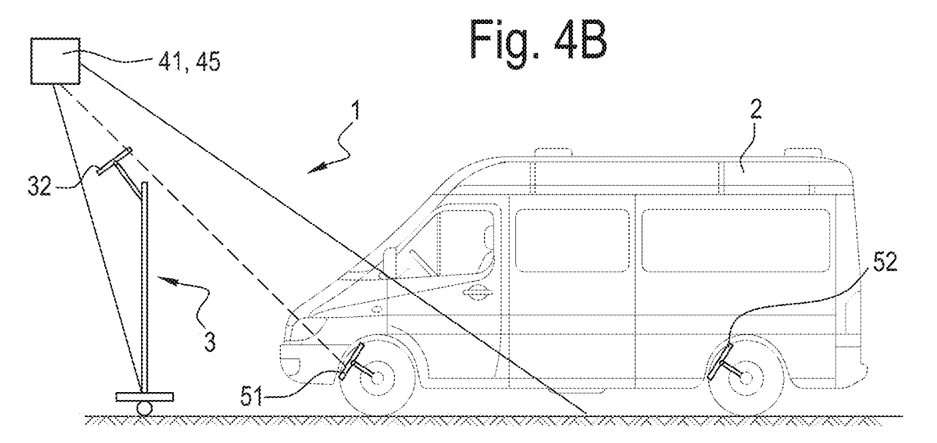

In an embodiment, the method comprises a step of capturing first image data through the camera 41 of the optical device 40. The first image data represent the rear wheel target 52 and the front wheel target 51 applied on the rear wheel and on the front wheel of the vehicle 2. In an embodiment, the first image data correspond to a single (first) image. In an embodiment, the method comprises a step of positioning the calibration structure 3 at a position in front of the vehicle 2, between the vehicle 2 and the apparatus 4; the step of positioning the calibration structure 3 may precede or follow the step of capturing the first image data. Preferably, during the step of positioning the structure 3, the vehicle 2 and the apparatus 4 are kept stationary. The method then comprises a step of capturing second image data, representing the structure target 32 and the front wheel target 51. The second image data may be captured as a single (second) image, including the structure target 32 and the front wheel target 51 (but not the rear wheel target 52), or as two images captured at a first and a second successive time instant, at which the apparatus 4 and the vehicle 2 remain stationary and wherein, at the first instant, the structure target 32 is not interposed between the camera 41 and the front wheel target 51 so the camera 41 captures an image of the front wheel target 51 (but not of the structure target 32, because it is not in position, nor of the rear wheel target 52, because it is outside the field of view of the camera 41), and at a second instant where the structure target 32 is interposed between the camera 41 and the front wheel target 51 so the camera 41 captures an image of the structure target 32 (but not of the front wheel target 51 because it is covered by the structure target 32, nor of the rear wheel target 52 because it is outside the field of view of the camera 41); from these images are derived the second image data.

Between the step of capturing the first image data and the step of capturing the second image data, the method may comprise a step of moving the apparatus 4 away from the vehicle 2, from a first position to a second position (relative to the vehicle 2). Thus, in the case where the first image data correspond to a single first image and the second image data correspond to a single second image, the first image is captured when the optical device 40 (or the apparatus 4, or the camera 41) is at the first position, and the second image is captured when the optical device 40 (or the apparatus 4, or the camera 41) is at the second position. In the case where, for example, the first image data correspond to a single first image and the second image data correspond to two second images, the first image is captured when the optical device 40 (or the apparatus 4, or the camera 41) is at the first position, and the two second images are captured when the optical device 40 (or the apparatus 4, or the camera 41) is at the second position.

In an embodiment, the method comprises a step of capturing third image data through the additional camera 42 (associated with the frame 44 of the apparatus 4) of the optical device 40. The third image data represent the additional rear wheel target 54 and the additional front wheel target 53 applied on the rear wheel and on the front wheel on the second side of the vehicle 2. In an embodiment, the third image data correspond to a single (third) image. Preferably, the third image data are captured simultaneously with the first image data when the optical device 40 (or the apparatus 4 or the additional camera 42) is at the first position. The method then comprises a step of capturing fourth image data, representing the additional structure target 33 and the additional front wheel target 53. The fourth image data may be captured as a single (fourth) image, including the additional structure target 33 and the additional front wheel target 53 (but not the additional rear wheel target 54), or as two images captured at a first and a second successive time instant, at which the apparatus 4 and the vehicle 2 remain stationary and wherein, at the first instant, the additional structure target 33 is not interposed between the additional camera 42 and the additional front wheel target 53 so the additional camera 42 captures an image of the additional front wheel target 53 (but not of the additional structure target 33, because it is not in position, nor of the additional rear wheel target 54, because it is outside the field of view of the additional camera 42), and at a second instant where the additional structure target 33 is interposed between the additional camera 42 and the additional front wheel target 53 so the additional camera 42 captures an image of the additional structure target 33 (but not of the additional front wheel target 53 because it is covered by the additional structure target 33, nor of the additional rear wheel target 54 because it is outside the field of view of the additional camera 42); from these images are derived the fourth image data. It should be observed that the second image data and the fourth image data are captured simultaneously. More specifically, in an embodiment, the camera 41 captures the second image while the additional camera 42 captures the fourth image. In another embodiment, at the same two time instants at which the camera 41 captures images used to derive the second image data, the additional camera 42 captures two images used to derive the fourth image data.

Between the step of capturing the first image data and the step of capturing the second image data (or between the step of capturing the third image data and the step of capturing the fourth image data), the method may comprise a step of moving the apparatus 4 away from the vehicle 2, from a first position to a second position (relative to the vehicle 2). Thus, in the case where the first image data correspond to a single first image and the second image data correspond to a single second image, the first image is captured when the optical device 40 (or the apparatus 4, or the camera 41) is at the first position, and the second image is captured when the optical device 40 (or the apparatus 4, or the camera 41) is at the second position. In the case where, for example, the first image data correspond to a single first image and the second image data correspond to two second images, the first image is captured when the optical device 40 (or the apparatus 4, or the camera 41) is at the first position, and the two second images are captured when the optical device 40 (or the apparatus 4, or the camera 41) is at the second position.

After the step of capturing the image data, the method may comprise a step of moving the apparatus 4 from the second position to the first position, towards the vehicle 2.

Figure 1:
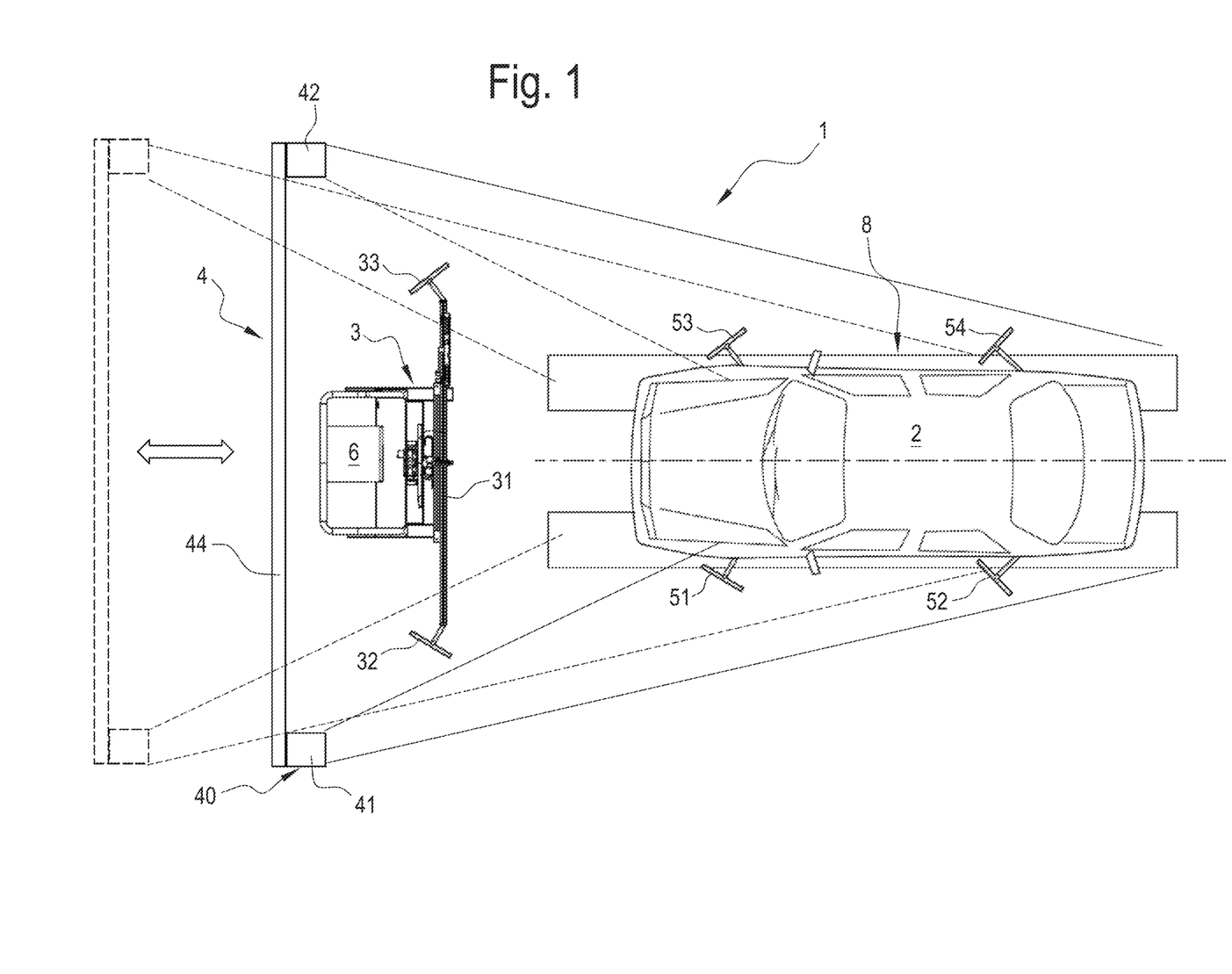
FIGS. 1 and 2 show top views of a vehicle service system according to respective embodiments of this disclosure.
Figure 2:
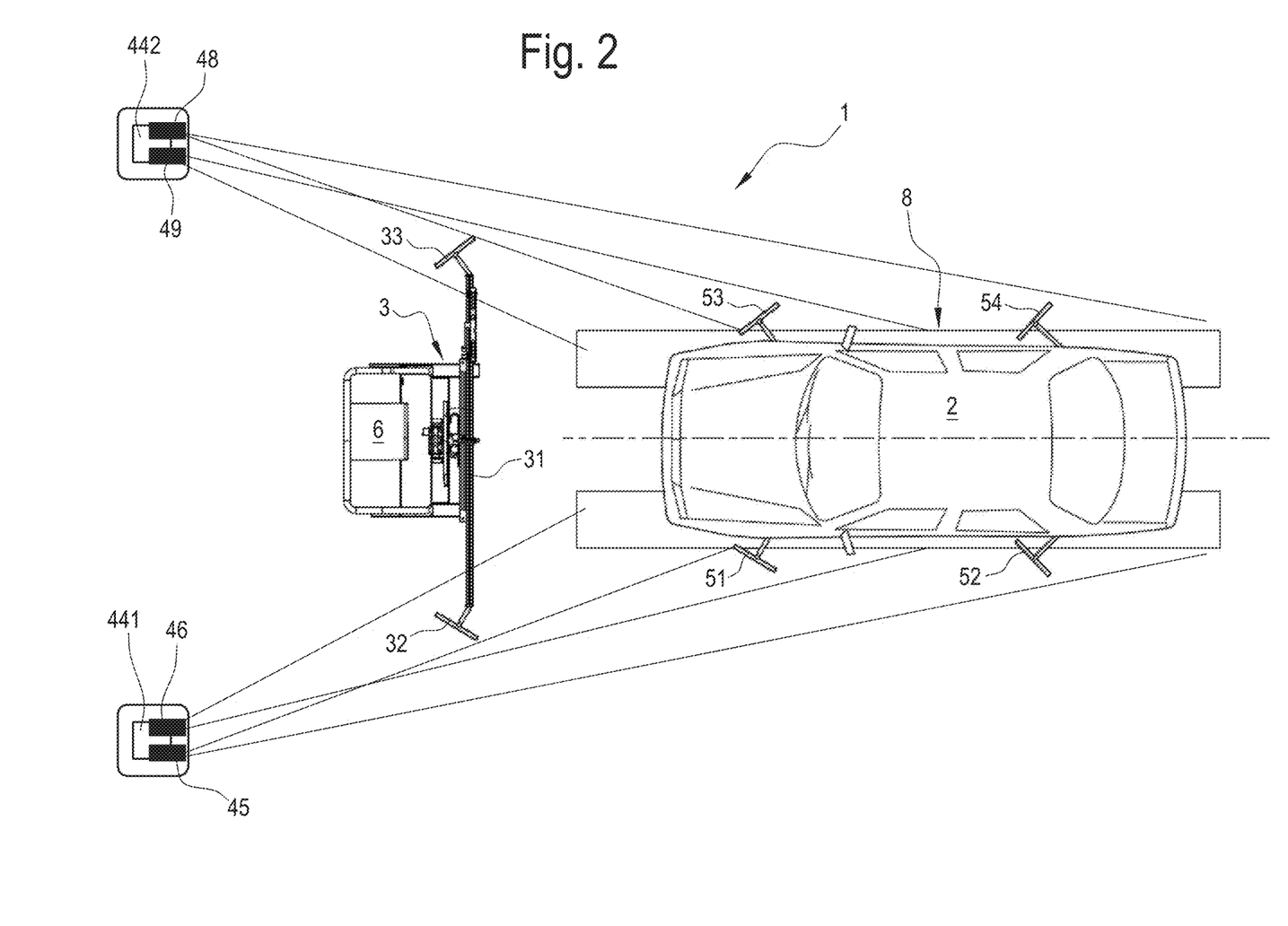

In an embodiment, the apparatus 4 comprises a first camera 45 to capture first image data and a second camera 46 to capture second image data. In this case, too, the first image data and the second image data may be captured in a single image and/or in two or more images. For example, the first camera 45 may capture a first image, including the front wheel target 51 and the rear wheel target 52, mounted on the front wheel and on the rear wheel of the vehicle 2, respectively, but not the structure target 32 (because this target is outside the field of view of the first camera 45). The second camera 46 may capture two images: one image including the front wheel target 51 but neither the rear wheel target 52 (because it is outside the field of view) nor the structure target 32 (because the structure 3 or the structure target 32 is not interposed between the apparatus 4 and the vehicle 2), and then, after positioning the structure 3 and/or the structure target 32 at the position interposed between the apparatus 4 and the vehicle 2, the second camera 46 may capture another image, including the structure target 32 but neither the front wheel target 51 (because it is hidden by the structure target 32) nor the rear wheel target 52 (because it is outside the field of view of the second camera 46).

Preferably, in this case, the apparatus 4 includes a first column 441 on which the first camera 45 and the second camera 46 are mounted. The first column is preferably fixed, that is, not movable.

Also, in this embodiment, the apparatus 4 may comprise a third camera 48 to capture third image data and a fourth camera 49 to capture fourth image data. In this case, too, the third image data and the fourth image data may be captured in a single image and/or in two or more images. For example, the third camera 48 may capture a third image, including the additional front wheel target 53 and the additional rear wheel target 54, mounted on the front wheel and on the rear wheel of the vehicle 2, respectively (but not the additional structure target 33 because it is outside the field of view of the third camera 48). The fourth camera 49 may capture two images: one image including the additional front wheel target 53 but neither the additional rear wheel target 54 (because it is outside the field of view) nor the additional structure target 33 (because the structure 3 or the additional structure target 33 is not interposed between the apparatus 4 and the vehicle 2), and then, after positioning the structure 3 and/or the additional structure target 33 at the position interposed between the apparatus 4 and the vehicle 2, the fourth camera 49 may capture another image, including the additional structure target 33 but neither the additional front wheel target 53 (because it is hidden by the additional structure target 32) nor the additional rear wheel target 54 (because it is outside the field of view of the fourth camera 49).

Preferably, in this case, the apparatus 4 includes a second column 442 on which the third camera 48 and the fourth camera 49 are mounted. The second column 442 is preferably fixed, that is, not movable. The first and second columns 441, 442 are spaced from each other.

It should also be noted that the structure target 32 and the additional structure target 33 may, in one embodiment, coincide with the rear wheel target 52 and the additional rear wheel target 54, respectively: in effect, after capturing the first image data, the operator can transfer the rear wheel target 52 and the additional rear wheel target 54 to the structure 3. That way, the system 1 includes a smaller number of targets.

The invention claimed is:

1. A method for aligning a vehicle service system relative to a vehicle positioned in a service area and provided with an advanced driver assistance system, ADAS, wherein the vehicle service system comprises:
  a calibration structure, wherein the calibration structure includes a calibration assistance device, configured to calibrate an ADAS sensor of the advanced driver assistance system of the vehicle, and a structure target, the calibration assistance device being provided either (i) with a panel bearing a predetermined combination of graphical features or (ii) with a reflector panel or a mirror or a prism;
  an apparatus for measuring the alignment of the vehicle, the apparatus including a frame, an optical device provided with a camera for capturing images being mounted on the frame,
  the method comprising the following steps:
  applying a front wheel target and a rear wheel target on a front wheel and on a rear wheel of the vehicle, respectively, wherein the front wheel and the rear wheel are located on a first side of the vehicle;
  positioning the calibration structure and the apparatus at a position in front of the vehicle;

capturing first image data and second image data through the optical device; and processing the first image data and the second image data in order to derive information useful for positioning the calibration structure relative to the vehicle, wherein the first image data represent the rear wheel target but not the structure target, and in that the second image data represent the structure target and the front wheel target but not the rear wheel target.

2. The method according to claim 1, wherein the first image data also represent the front wheel target.

3. The method according to claim 2, wherein the first image data are captured before the second image data are captured.

4. The method according to claim 3, comprising, between the step of capturing the first image data and the step of capturing the second image data, a step of moving the optical device from a first position to a second position, different from the first position, wherein the first image data are captured when the optical device is at the first position and the second image data are captured when the optical device is at the second position.

5. The method according to claim 3, wherein the optical device includes a camera and wherein the first image data and second image data are captured by the camera.

6. The method according to claim 5, wherein the optical device includes an additional camera and wherein the method further comprises the following steps:

applying an additional front wheel target and an additional rear wheel target on an additional front wheel and on an additional rear wheel of the vehicle, respectively, wherein the additional front wheel and the additional rear wheel are located on a second side of the vehicle, opposite to the first side;

capturing third image data, representing the additional rear wheel target, through the additional camera, when the optical device is at the first position;

capturing fourth image data, representing the additional front wheel target, through the additional camera, when the optical device is at the second position.

7. The method according to claim 6, wherein the step of moving the optical device from the first to the second position is accomplished by moving a frame of the apparatus, wherein the camera and the additional camera are connected to the frame and spaced from each other.

8. The method according to claim 7, wherein the step of moving the optical device from the first position to the second position corresponds to a step of moving the frame away from the vehicle.

9. The method according to claim 8, wherein the frame moves away from the vehicle along an axis of symmetry and along a thrust axis of the vehicle.

10. The method according to claim 6, wherein the calibration structure includes an additional structure target, wherein the fourth image data also represent the additional structure target but not the additional rear wheel target.

11. The method according to claim 10, wherein the third image data also represent the additional front wheel target but not the additional structure target.

12. The method according to claim 1, wherein the optical device comprises a first camera and wherein a second optical device including a second camera is provided, the first camera and the second camera having different fields of view, wherein the first image data are captured by the first camera and the second image data are captured by the second camera.

13. The method according to claim 12, wherein a third camera and a fourth camera are provided, having different fields of view, the third and fourth cameras being spaced from the first and second cameras and wherein the method further comprises the following steps:

applying an additional front wheel target and an additional rear wheel target on an additional front wheel and on an additional rear wheel of the vehicle, respectively, wherein the additional front wheel and the additional rear wheel are located on a second side of the vehicle, opposite to the first side;

capturing third image data, representing the additional rear wheel target, through the third camera; and capturing fourth image data, representing the additional front wheel target but not the additional rear wheel target, through the fourth camera.

14. The method according to claim 1, wherein the optical device captures a first image including the rear wheel target and the front wheel target, and a second image including the structure target and the front wheel target, wherein the first image defines the first image data and the second image defines the second image data.

15. The method according to claim 1, wherein the optical device captures a first image including the rear wheel target, a second image including the front wheel target, a third image including the structure target and a fourth image including the front wheel target, wherein the first image data are obtained by a control unit processing the first image and the second image, the control unit being provided with a computer; and the second image data are obtained by the control unit processing the third image and the fourth image.

16. A vehicle service system for a vehicle provided with an advanced driver assistance system, ADAS, the system comprising:

a calibration structure, wherein the calibration structure includes a calibration assistance device, configured to calibrate an ADAS sensor of the advanced driver assistance system of a vehicle, and a structure target;

an optical device provided with a camera, for capturing first image data and second image data;

an apparatus for measuring the alignment of the vehicle, the apparatus including a frame, the optical device being mounted on the frame;

a front wheel target and a rear wheel target configured to be applied on a front wheel and on a rear wheel of the vehicle, respectively, wherein the front wheel and the rear wheel are located on a first side of the vehicle; and a control unit, provided with a computer and configured to process the first image data and the second image data captured by the optical device in an operating configuration wherein the calibration structure and the apparatus are in front of the vehicle and wherein the control unit is configured to derive information useful for positioning the calibration structure relative to the vehicle as a function of the first image data and of the second image data, wherein the optical device is configured to operate according to a first orientation to capture the first image data and according to a second orientation to capture the second image data, so the first image data represent the rear wheel target but not the structure target, and in that the second image data represent the structure target and the front wheel target but not the rear wheel target.

17. The system according to claim 16, wherein the first image data also represent the front wheel target.

18. The system according to claim 17, wherein the optical device is operatively positionable at a first position and at a second position, different from the first position, and includes:
  a frame;
  a camera, associated with the frame and, when the optical device is at the first position, having the first orientation and, when the optical device is at the second position, having the second orientation, so the camera is configured to capture the first image data when the optical device is at the first position and the second image data when the optical device is at the second position.

19. The system according to claim 18, further comprising:
an additional camera, associated with the frame;
an additional front wheel target and an additional rear wheel target configured to be applied on an additional front wheel and on an additional rear wheel of the vehicle, respectively, wherein the additional front wheel and the additional rear wheel are located on a second side of the vehicle, opposite to the first side,
  wherein the additional camera is configured, when the optical device is at the first position, to capture third image data, representing the additional rear wheel target, and when the optical device is at the second position, it is configured to capture fourth image data, representing the additional front wheel target.

20. The system according to claim 16, wherein the optical device comprises a first camera and wherein a second camera is provided, the first camera and the second camera having the first and the second orientation, respectively, so the first camera is configured to capture the first image data and the second camera is configured to capture the second image data.

* * * * *